Fig. 2

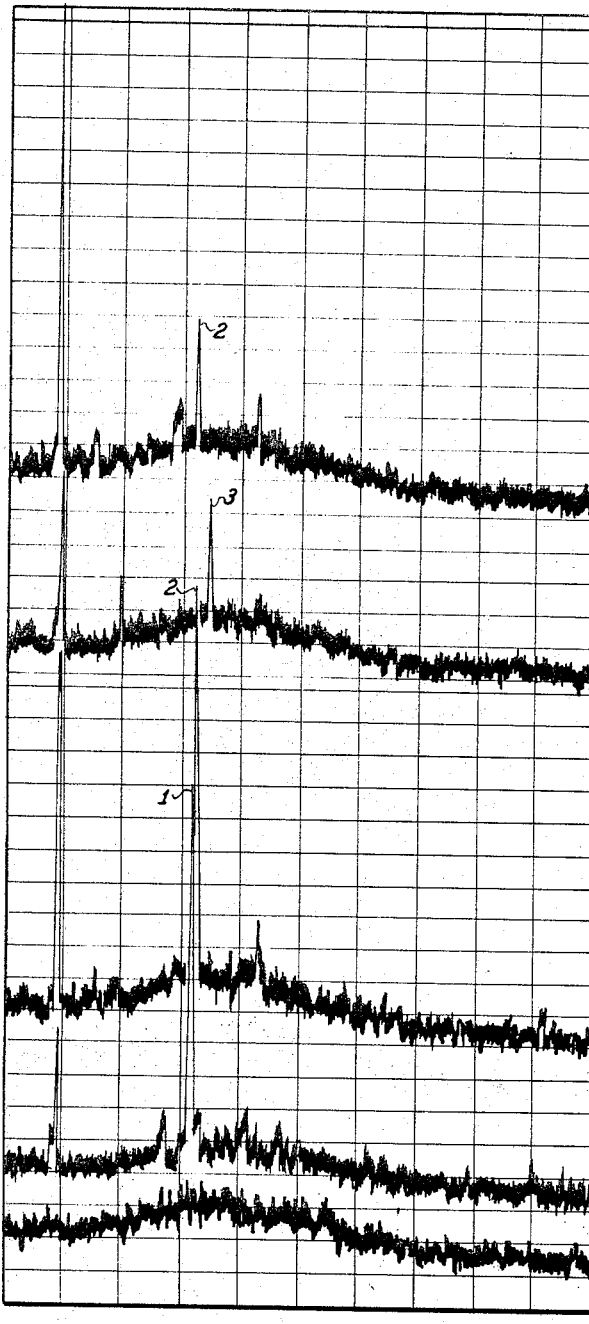

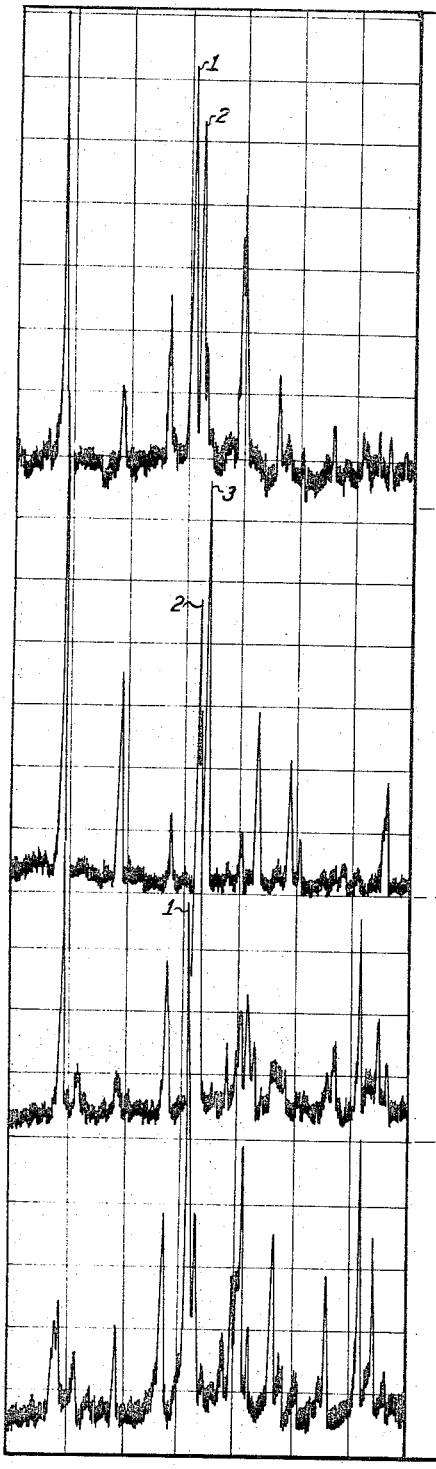

I
POWDER PATTERN OF GROUND MECHANICAL MIXTURE OF N,N-DICHLORO-DIMETHYLHYDANTOIN & OF N,N-DIBROMO-DIMETHYLHYDANTOIN

NOTE APPEARANCE OF STRONG N-MONOBROMO-N-MONOCHLORO-DIMETHYLHYDANTOIN LINE 2. THE N,N-DICHLORO-DIMETHYLHYDANTOIN LINE 3 HAS DISAPPEARED. THE N,N-DIBROMO-DIMETHYLHYDANTOIN LINE 1 REMAINS, INDICATING UNREACTED MATERIAL.

H
POWDER DIFFRACTION PATTERN OF N,N-DICHLORO-DIMETHYLHYDANTOIN.

NOTE STRONG LINE 3

G
POWDER DIFFRACTION PATTERN OF N-MONOBROMO-N-MONOCHLORO DIMETHYLHYDANTOIN.

NOTE STRONG LINE 2

F
POWDER DIFFRACTION PATTERN OF N,N-DIBROMO-DIMETHYLHYDANTOIN.

NOTE STRONG LINE 1

INVENTOR
LAURENE O. PATERSON
BY
ATTORNEY

United States Patent Office 3,345,371
Patented Oct. 3, 1967

3,345,371
N - BROMINATED - N - CHLORINATED ORGANIC COMPOUNDS AND PROCESS FOR PREPARING SAME
Laurene O. Paterson, Adrian, Mich., assignor to Drug Research, Inc., Adrian, Mich., a corporation of Michigan
Filed Aug. 25, 1965, Ser. No. 486,589
20 Claims. (Cl. 260—192)

This application is a continuation-in-part of my copending applications, Ser. Nos. 119,756 filed Apr. 7, 1961, now abandoned, and 143,565 filed Oct. 9, 1961, now abandoned, in turn copending with Ser No. 593,047 filed June 22, 1956, now U.S. Patent 3,147,259, and Ser. No. 126,403 filed June 14, 1961, now U.S. Patent 3,147,219, and relates to a new method of preparing N-halogenated organic compounds, and more particularly, to the preparation of organic halogen carriers containing both bromine and chlorine.

In a broad aspect of the invention N-brominated-N-chlorinated organic compounds are prepared by mixing a multi-N-chlorinated organic compound with a multi-N-brominated organic compound. The multi-N-halogenated compounds which are used as starting materials must contain at least two =NCl radicals and two =NBr radicals respectively and may contain more than this number of active halogen groups.

The compounds which may be prepared by the present process contain at least one N-chloro- radical and one N-bromo- radical, and may contain additional N-chloro- and N-bromo-groups. Such compounds are characterized as halogenating agents. The halogen is loosely bound to the N-atom, being of the "positive" or "active" variety.

As discussed in U.S. Patent 3,147,219, halogen carriers providing both bromine and chlorine have particular merit as disinfectants. The inclusion of the bromine atom not only enhances the biocidal properties of these compounds over the all-chloro compounds of the prior art, but quite unexpectedly the chlorine moiety also assumes a "free" or "active" form in the water. The mixed N-halogenated compounds also react readily with olefinic compounds to form the halogenated adducts as described in my copending application Ser. No. 510,869, filed May 24, 1955, now U.S. Patent 2,986,555, of which this application is a continuation-in-part.

The methods employed in the prior art process to prepare the N-brominated-N-chlorinated organic compounds comprise the reaction of the carrier compound in an aqueous alkaline medium with elementary bromine and chlorine. When both chlorine and bromine are reacted simultaneously with an organic compound containing more than one replaceable hydrogen in =NH radicals, the two different halogen atoms would be expected to assume positions in the molecule consistent with their electron and spatial requirements. However, it has now been unexpectedly found that by merely mixing a multi-N-chlorinated- with a multi-N-brominated organic compound the chlorine and bromine atoms tend to migrate to form mixed halogenated derivatives. Indeed the degree and the speed of halogen interchange is remarkable. This tendency for halogen migration provides an excellent and simple process for the preparation of the various N-brominated-N-chlorinated organic compounds. Since bromine and chlorine are dangerous to handle, it would also be advantageous to provide a process which did not involve the use of these toxic materials.

Accordingly, it is an object of the present invention to provide a simple and safe process for the preparation of the N-brominated-N-chlorinated compounds.

Generally the multi-N-halogenated organic compounds from which the N-brominated-N-chlorinated derivatives are prepared may be classified as N-halogenated organic amides, imides and amidines, and are represented by the following typical structures:

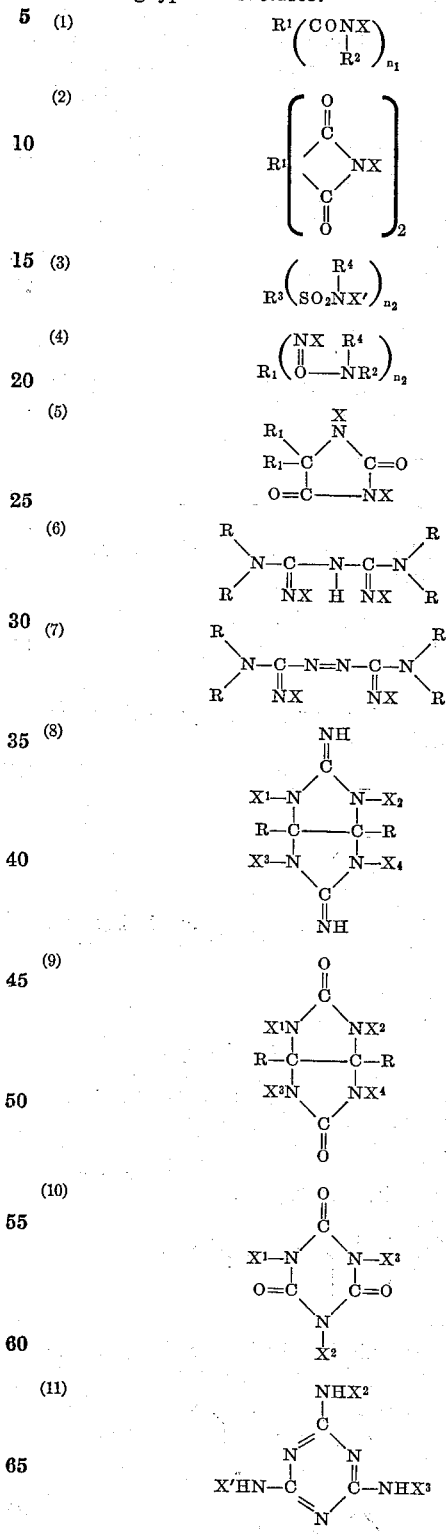

In the above formulae, R is selected from the group consisting of hydrogen, lower alkyl and phenyl; $R^1$ is a mono- or multivalent radical of the group consisting of alkyl, alkylene, saturated and aromatic monocyclic hydrocarbon radicals and their lower alkyl derivatives, all of which may be further substituted with lower acyl, lower alkoxy, halogen, carboxy and sulfonic acid groups; $R^2$ may be hydrogen, lower alkyl having up to 6 carbon atoms and aromatic monocyclic hydrocarbon radical; $R^3$ may be an aromatic radical having up to 10 carbon atoms and its lower alkyl derivatives which may be further substituted with lower acyl, lower alkoxy, halogen, carboxy and sulfonic acid groups; $R^4$ may be hydrogen, lower alkyl having up to 6 carbon atoms, lower acyl having up to 6 carbon atoms, phenyl, bromine or chlorine; X may be either all-bromine or all-chlorine for each such structure; $X^1$, $X^2$, $X^3$ and $X^4$ are selected from the group consisting of hydrogen, chlorine and bromine, and at least two are bromine or chlorine; $n_1$ is an integer from 2 to 4; and $n_2$ is an integer from 1 to 2.

In the above formulae where $R^1$ is a divalent alkylene there are included such radicals as $$-CH_2-CH_2-,\ -CH_2-CH-,\ -CH_2-CH-CH_2CH_2CH_3,$$
$$\qquad\qquad\qquad\quad |\qquad\qquad\quad |$$
$$\qquad\qquad\qquad\ CH_3$$

$$C_{10}H_{21}-CH-CH_2-$$
$$\qquad\qquad\ |$$

and the like; where $R^1$ and $R^3$ are divalent monocyclic arylene there are included such radicals as

[phenyl, tolyl, benzoic acid structures]

and the like; where $R^1$ is a tetravalent alkylene there are included such radicals as $$H_3C-\overset{|}{\underset{|}{C}}-\overset{|}{\underset{|}{C}}-CH_3,$$

[cyclohexane with four bonds]

and the like; where $R^1$ is a tetravalent arylene there are included such radicals as

[benzene with four bonds]

and the like.

Where $R^1$, $R^2$, or $R^4$ is a lower alkyl, such radicals as methyl, ethyl, 2-chloro-propyl, tertiary butyl, isoamyl, secondary hexyl, and the like are included; by the term "lower acyl," such radicals as acetyl, butyryl and the like are meant; by the term "lower alkoxy," methoxy, ethoxy, isobutoxy, n-heptoxy and the like are meant.

Where $R^1$, $R^2$, or $R^3$ is aromatic or alkyl aromatic, the radical can be phenyl, tolyl, xylyl, naphthyl, benzyl, mesityl, ethyl phenyl, methoxyphenyl, ethoxyphenyl, acetylphenyl, butyrylphenyl, propionylphenyl.

Where $R^1$, $R^2$, $R^3$ or $R^4$ is substituted with halogen, such halogen may be chlorine, bromine, iodine and fluorine. The following radicals are typical:

$$-CH_2-\overset{Cl}{\underset{|}{CH}}-,$$

[phenyl-C-C-Br, phenyl-CH-CH₂-I structures]

Where $R^1$ and $R^3$ are substituted with a carboxy radical or sulfonic acid groups, typical examples are:

$$-CH_2CH_2COOH,\ CH_3-\overset{|}{\underset{CH_3}{C}}-CH_2-,$$
$$\qquad\qquad\qquad\qquad\ \diagdown SO_3Na$$

[phenyl-COOH, phenyl-SO₂OH]

and the like.

Where the compounds are acidic due to the presence of a carboxy, sulfonic or "positive" halogen radical, they may have preferred use in the form of their salts. When the N-halogenated organic compound tends to be inherently basic due to the presence of free amino groups, such compounds may be isolated in the form of their hydrogen halide salts. X represents the "active" halogen which may be either bromine or chlorine. Where a given molecule contains only two halogens they must be of the same type.

Formula 1 represents the N-halogenated diamides such as $N,N^1$ - dichlorosuccinamide, $N,N^1$ - dichloro - $N,N^1$-diethyl - glutaric-diamide, $N,N^1$ - dichloro - 2 - chloro-$N,N^1$ - dimethyl - adipic - diamide, $N,N^1$ - dichloro-phthalic diamide, $N,N^1$ - dichloro - 2 - methoxy - $N,N^1$-dimethyl-terephthalic diamide, and their corresponding $N,N^1$-1-dibromo-derivatives.

Formula 2 represents the N-halogenated diimides such as $N,N^1$ - dichloro - pyromellitic diimide and $N,N^1$ - dichloro-bicycloazole-2,5-dione having the structure $$\begin{array}{c} O\ \ H\ \ O \\ \|\ \ \ |\ \ \ \| \\ Cl-N \diagup \overset{C-C-C}{\underset{C-C-C}{\ }} \diagdown N-Cl \\ \|\ \ \ |\ \ \ \| \\ O\ \ H\ \ O \end{array}$$

and the like, and the corresponding $N,N^1$-dibromo-derivatives.

Formula 3 represents the N-halogenated sulfonamides such as N,N-dichloro-benzene sulfonamide and sodium $N,N^1$-dichloro-toluene-2,4-disulfonamide and the corresponding N,N-dibromo-derivatives.

Formula 4 represents the N-halogenated amidines such as $$\begin{array}{c} N-Cl \\ \| \\ CH_2-C-CHCH_3\quad\text{and} \\ | \\ CH_2-C-CHCH_3 \\ \| \\ N-Cl \end{array}\qquad\begin{array}{c} NCl \\ | \\ \text{[phenyl]}-C-N-Cl \\ | \\ CH_3 \end{array}$$

and the corresponding dibromo-derivative.

Formula 5 represents the N-halogenated hydantoins such as $N,N^1$ - dichloro - 5 - methyl - hydantoin, $N,N^1$-dichloro-5-pentamethylene hydantoin, $N,N^1$-dichloro-5-carboxyethyl-5-methyl-hydantoin, and sulfonic derivative having the formula $$\begin{array}{c}\qquad\quad CH_3\ \ NCl \\ \qquad\quad\ \diagdown\ \diagup \\ (CH_3)_2C-CH_2-C\quad\ \ C=O \\ |\qquad\qquad\quad | \\ SO_3Na\quad\quad\ O=C-NCl \end{array}$$

and the corresponding bromine compounds.

Closely related to the N-halogenated amidines of Formula 4, are the compounds of Formulae 6 and 7, the amidines of carbonic acid. Typical derivatives are the $N,N^1$ - dichloro - N - tetra - methyl-substituted biguanides (Formula 6) such as $$\begin{array}{c} CH_3\qquad\qquad\qquad\quad CH_3 \\ \diagdown\qquad\qquad\qquad\quad\diagup \\ N-C-N-C-N \\ \diagup\ \|\ \ \ |\ \ \ \|\ \diagdown \\ CH_3\ NCl\ H\ NCl\ CH_3 \end{array}$$

and the $N,N^1$-dihalo-N-tetra-substituted azodicarbonamidines (Formula 7), such as $N,N^1$-dichloro-azodicarbonamidine hydrochloride, $$\begin{array}{c} H_2N-C-N=N-C-NH_2\cdot HCl \\ \|\qquad\qquad\qquad\| \\ NCl\qquad\qquad\quad\ NCl \end{array}$$

and the corresponding dibromo-derivative.

Another type of compound closely related to the N-halogenated amidines of Formula 4, is the N-halogenated-2,5-diimino-glycolurils (Formula 8), as for example $N^1,N^3,N^4,N^6$-tetrachloro-2,5-diimino - 7,8 - dimethyl glycoluril and the corresponding bromine derivatives.

in the case of the reaction product of Example 1 only 4%. In this latter instance, adduct formation had been the preferred reaction and substantiates the X-ray and melting point data that halogen migration had taken place in the mixture of Example 1 to form the N-bromo-N-chloro-dimethylhydantoin.

It is not always necessary or desirable to form the pure N-brominated -N-chlorinated derivative.

Example 2

Nineteen and seven-tenths grams (0.1 mol) of powdered N,N-dichlorodimethylhydantoin were mixed thoroughly with 38.1 grams (0.13 mol) of powdered N,N-dibromo-dimethylhydantoin. After standing 15 minutes, a sample of the powdered mixture was subjected to X-ray diffraction studies, the results of which are shown in the graph of FIG. 2. That the reaction product contained high percentages of the N-bromo-N-chloro-dimethylhydantoin was confirmed by reacting it with methyl oleate as discussed in Example 1. The dimethylhydantoin recovery was but 10%, a portion of which came from the excess N,N-dibromo-dimethylhydantoin.

Although in the above examples halogen interchange between hydantoins containing the same 5-substituents are shown, the 5-substituent need not be the same. N,N-dichloro-dimethylhydantoin may be mixed with the N,N-dibromo-diphenylhydantoin, for instance. Under these conditions halogen migration resulted in the formation of the N-bromo-N-chloro-dimethylhydantoin and N-bromo-N-chloro-diphenylhydantoin. In a like manner, other N-brominated-N-chlorinated derivatives have been prepared by mixing various 5-substituted hydantoins. N-bromo-N-chloro-5-methyl-5-carboxy ethyl hydantoin and 5-methyl-5-(isobutyl-2-sulfonic acid) hydantoin are representative of hydantoins which contain acid groups and may be isolated as salts having enhanced water solubility over the poorly water-soluble hydantoins such as N-bromo-N-chloro-dimethylhydantoin. Because of their very superior disinfecting properties, N-bromo-N-chloro-hydantoins containing such acid groups are valuable components in sanitizers and bleaches, particularly for hospital use.

Example 3

Twenty-five and five-tenths grams (0.1 mol) of finely-ground N,N-dichloro-5-methyl-5-carboxy-ethyl hydantoin, 34.4 grams (0.1 mol) of N,N-dibromo-5-methyl-5-carboxy-ethyl hydantoin were slurried in 210 ml. of water containing 24.8 grams (0.2 mol) of sodium carbonate. Stirring was continued until effervescence ceased. The mixture thickened, was broken up and dried. The resultant product consisted essentially of the sodium salt of N-bromo-N-chloro-5-methyl-5-carboxy-ethyl hydantoin. It was quickly and completely soluble in water to supply up to 1000 mgm. per liter active halogen.

Example 4

A detergent and disinfecting dishwashing formulation containing the sodium salt of N-bromo-N-chloro- derivative having high bactericidal activity and quick solubility was compounded as follows:

Two hundred pounds of N,N-dichloro-5-methyl-5-(isobutyl-2-sulfonic acid) hydantoin and 128 pounds of N,N-dibromo-5-(isobutyl-2-sulfonic acid) hydantoin were dry-mixed with 6 pounds of Rohm and Haas Triton CF-10 and sufficient sodium tripolyphosphate to provide an ultimate use pH of about 7.5.

From the foregoing, it is apparent that two different types of what might aptly be termed multi-N-halogenated hydantoins may exist, and which can be made by the method herein described. The bromine may be attached to the nitrogen atom in the 1-position which is vicinal to the 5-substituted carbon atom, or may be attached to the nitrogen atom in the 3-position. It has not been definitely established that the N-bromo-N-chloro-derivative is not a mixture of the two isomers. However, since bromine has the larger atomic radius, it is likely that within the crystographic lattice bromine preferentially occupies the 3-position and chlorine the 1-position.

It is even more surprising when it is found that multi-N-chlorinated and multi-N-brominated derivatives of entirely different types of carrier compounds react to form the N-brominated-N-chlorinated products. Table 1 lists certain of the multi-N-chlorinated and multi-N-brominated derivatives which were mixed in both equivalent and non-equivalent amounts. The products of such admixture were more difficult to identify, but a plus mark in the appropriate square indicates that evidence of halogen migration was obtained, and that the formation of the N-brominated-N-chlorinated compounds was clearly demonstrated by one of the methods discussed in Example 1. Melting points of the mixed halogen derivatives are shown where these were obtainable.

Example 5 specifically illustrates the preparation of a mixture of N-brominated-N-chlorinated compounds by the present process.

Example 5

Thirty and nine-tenths grams (0.1 mol) of sodium N,N-dibromo-cyanurate were dissolved in 300 ml. of water; to this solution were added 28 grams (0.114 mol) of N,N,N-trichloro-glycoluril and the mixture stirred for 10 minutes. The precipitate was filtered off and dried. X-ray diffraction studies showed it to be substantially N-bromo-N,N-dichloro-glycoluril. A sample of the filtrate was air-dried. This, too, was subjected to X-ray diffraction examination. The major component of the soluble fraction was the sodium salt of N-bromo-N-chloro-cyanuric acid.

TABLE 1

|  | Sodium N,N-dibromo-cyanurate | N,N-dibromo-3a,6a-dimethyl-glycoluril | N,N,N,N-tetra-bromo-3a,6a-dimethyl-glycoluril | N,N-dibromo-toluene-2,4-disulfonamide | N,N-dibromo-dimethyl-hydantoin | N,N-dibromo-5-methyl-5-carboxy-ethyl-hydantoiy |
|---|---|---|---|---|---|---|
| Sodium N,N-dichloro-cyanurate | + | + | + |  | + | + |
| N,N-dichloro-3a,6a-dimethyl-glycoluril | + | + | + | + | + |  |
| N,N,N,N-tetra-chloro-3a,6a-dimethyl-glycoluril | + | + | + | + | + |  |
| N,N-dichloro-toluene-2,4-disulfonamide | + | + | + | + | + |  |
| N,N,N-trichloro-glycoluril | + | + | + | + | + |  |
| N,N-dichloro-cyanuric acid | + | + | + |  | + |  |
| Potassium N,N-dichloro-cyanurate | + | + | + |  | + | + |
| N,N-dichloro-5-methyl-5-carboxy-ethylhydantoin | + | + | + |  | + | + |

Formula 9 represents the N-halogenated glycolurils such as $N^1,N^3,N^4$-trichloro-7,8-diphenyl glycoluril.

Another class of compounds which has wide application as N-halogen carriers are the N-substituted ureas and urea derivatives. As typical examples may be selected N,-$N^1$-dichloro-N,$N^1$-diphenyl urea, N,$N^1$-dichloro-cyanuric acid (Formula 10), $N^1,N^2,N^3$-trichloro-N,$N^3$-dimethyl buiret and corresponding bromine derivatives. The N-halogenated melamines, represented by Formula 11, such as $N^1,N^2,N^3$-trichloro-melamine, are also suitable for the purpose.

When salts are used, they may be of the alkali metals such as sodium, potassium and lithium, or of the alkaline earth metals such as calcium and magnesium. The aluminum, tin, and zinc salts are also of value. Typical compounds which may be used are sodium N,$N^1$-dichloro-cyanurate, potassium N,$N^1$-dichloro-toluene-2,4-disulfon-amide and their bromine counterparts.

The process of the present invention may be carried out by mixing the multi-N-chlorinated organic compound with the multi-N-brominated organic compound, both materials being in dry powder form. The two components may also be mixed as slurries or concentrates in water or other suitable solvent. For instance, to form the N-brominated-N-chlorinated hydantoins FIG. 1 and FIG. 2 show the techniques used. To form pure N-bromo-N-chloro-dimethylhydantoin an equimolecular mixture of the N,$N^1$-dichloro-dimethylhydantoin and the N,$N^1$-dibromo-dimethylhydantoin is used, as illustrated in the following equation:

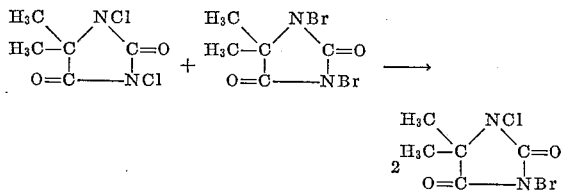

By using more or less of the N,$N^1$-dichloro-dimethylhydantoin it is possible to prepare various amounts of N-bromo-N-chloro-dimethylhydantoin in admixture with either the N,$N^1$-dichloro-dimethylhydantoin or N,$N^1$-dibromo-dimethylhydantoin derivative.

That the N-brominated-N-chlorinated organic compounds are definite entities and do not represent mere mechanical mixtures of the multi-N-chlorinated and multi-N-brominated compounds can be established by several means.

X-ray diffraction studies of mixtures of the various N-halogenated organic compounds are particularly instructive. X-ray diffraction patterns were determined for the pure multi-N-chlorinated compound, the pure multi-N-brominated compound and the respective N-brominated-N-chlorinated derivatives. A typical series of such diffraction patterns are shown in the graph of FIG. 1 and the graph of FIG. 2 for the N-halogenated dimethylhydantoins. The preparation of the N-bromo-N-chloro-dimethylhydantoin by the two methods illustrated is described in greater detail in Examples 1 and 2.

Although many of the N-halogenated organic compounds do not have true melting points, in certain instances these were obtainable and are given.

Still further confirmation of halogen interchange in mixtures of multi-N-chlorinated and multi-N-brominated organic compounds is shown by the products of the chemical reaction of such mixtures with olefines as described in co-pending patent application Ser. No. 510,869, now U.S. Patent 2,986,555. It is known that when halogen carriers which contain either bromine or chlorine alone are reacted with an olefinic compound, the halogen tends to preferentially substitute for the hydrogen atom allylic to the double bond:

EQUATION 1

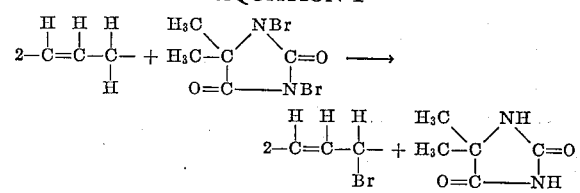

However, when halogen carriers containing both chlorine and bromine as part of the same molecule react with olefines, adduct formation takes place at the double bond to attach both the hydantoin moiety and one of the halogens. For the purposes of easily identifying the end products, the reaction is usually carried out in a solvent such as carbon tetrachloride.

EQUATION 2

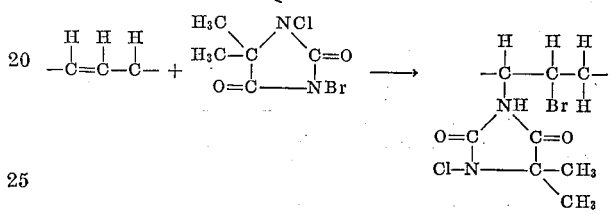

The reactions as shown in Equations 1 and 2 can be distinguished since, in the reaction of Equation 1 the freed dimethylhydantoin is insoluble in carbon tetrachloride and precipitates out; it can be filtered off, dried and weighed. In the reaction as illustrated in Equation 2, the dimethylhydantoin becomes a part of the reacted compound, such compound usually being soluble in the carbon tetrachloride. Thus by the determination of the amount of the carrier compound recovered from such a mixture, the extent to which the premixed multi-N-chlorinated and multi-N-brominated compound have reacted to form the N-brominated-N-chlorinated derivative is indicated.

The following examples illustrate the foregoing embodiments of the process of the present invention:

*Example 1*

Nineteen and seven-tenths grams (0.1 mol) of N,N-dichloro-dimethylhydantoin were suspended in 100 ml. of water and 28.6 grams (0.1 mol) of N,N-dibromodimethylhydantoin were stirred in. Stirring was continued for 30 minutes, the water filtered off, and the product dried. The melting point of the resultant compound was 166° C., typical of N-bromo-N-chloro-dimethylhydantoin. The series of X-ray diffraction patterns shown in the graph of FIG. 1 indicate that the reaction product was indeed N-bromo-N-chloro-dimethylhydantoin, and that the N,N-dichloro-dimethylhydantoin and the N,N-dibromo-dimethylhydantoin had substantially disappeared.

To further confirm that the product of Example 1 was N-bromo-N-chloro-dimethylhydantoin it was reacted with methyl oleate, and the products of this reaction compared with those obtained under similar conditions when using N,N-dichloro-dimethylhydantoin and N,N-dibromo-dimethylhydantoin separately. Three 150 ml. flasks were prepared, each containing 29.6 grams (0.1 mol) of methyl oleate dissolved in 50 ml. of carbon tetrachloride. To one of the flasks were added 14.3 grams (0.05 mol) of N,N-dibromo-dimethylhydantoin, to another 9.8 grams (0.05 mol) of N,N-dichloro-dimethylhydantoin, and to the third flask 12 grams of the reaction product of Example 1. Each flask was supplied with a condenser and heated to 80° C. and held at this temperature for 15 minutes. The reaction mixtures were then allowed to stand over night to facilitate precipitation of the dimethylhydantoin.

In the case of the N,N-dibromo-dimethylhydantoin, 94% of the dimethylhydantoin was recovered, in the case of the N,N-dichloro-compound, 92% while Following the general procedure as outlined in Examples 1, 2, and 3, various halogenated derivatives listed in the vertical column of Table 1 were reacted with members listed across the top.

It can be understood that in such non-symmetrical 5-substituted rings as dimethylhydantoin, the free area and electron distribution in the crystographic lattice at the 1-nitrogen position would be different than at the 3-nitrogen position. Chlorine and bromine interchange between an N,N-dichlorinated and N,N-dibrominated derivative to meet these demands can be so explained. However, to understand halogen interchange between symmetrical heterocyclic molecules such as the cyanuric acids, the glycolurils, and the benzene disulfonamides, it must be pointed out that substitution of even a single halogen into the molecule radically alters the electron distribution. When the further electron shifts attendant upon salt formation are considered, interchange of the more electronegative chlorine for the less electro-negative bromine may be understood. The many halogen shifts between the carrier compounds listed in Table 1 may become very complex, but in every instance where shown by the plus mark (+), the N-brominated-N-chlorinated derivative was verified.

In summary, it is evident that the process of the present invention is broadly applicable to the production of a wide variety of N-brominated-N-chlorinated organic compounds. Certain of such multi-N-halogenated organic compounds showing utility have been specifically mentioned in Examples 1 through 4, and Table 1. Other carrier compounds from which the N-brominated-N-chlorinated compounds have been prepared and which show particular merit are: pyromellitic diimide, toluene and benzene sulfonamide, p sulfamoyl benzoic acid and its salts, the azodicarbonamidines, the biguanides, the N-substituted ureas, and dicyandiamines, the 2,5-imino glycolurils, melamine, and the N-substituted succinamides and malonamides.

An example of a diimide is the following:

*Example 6*

28.4 grams (.1 mol) of finely-ground N,N'-dichloropyromellitic diimide and 37.4 grams (.1 mol) of similarly ground N,N'-dibromopyromellitic diimide were slurried in 500 ml. of water for thirty minutes. The resultant product was filtered off. It consisted essentially of N-bromo-N'-chloropyromellitic diimide, being readily identified by its reaction with methyl oleate.

An example of such N-substituted malonamide is as follows:

*Example 7*

26.9 grams (.1 mol) of N,N'-dimethyltetrachloromalonamide and 35.1 grams (.1 mol) of N,N'-dimethyl-N,N'-dibromodichloro-malonamide was dissolved in 400 ml. of methylene dichloride. The solvent was evaporated off, providing the N-chloro-N-bromo reaction product containing 10.8% active chlorine and 25% active bromine.

"Lower" as used in the claims to refer to lower alkyl, lower alkoxy and lower acyl means a group having from one to six carbon atoms.

While several particular embodiments of this invention are shown above, it will be understood, of course, that the invention is not limited thereto, since many modifications may be made, and it is contemplated, therefore, by the appended claims, to cover any such modifications as fall within the true spirit and scope of this invention.

Having regard to the foregoing disclosure, the following is claimed as the inventive and patentable embodiments thereof:

1. A process for preparing N-brominated-N-chlorinated organic compounds which comprises mixing a compound having at least two N-chloro radicals and a compound having at least two N-bromo radicals, said compounds being selected from the group consisting of compounds having the general formulae:

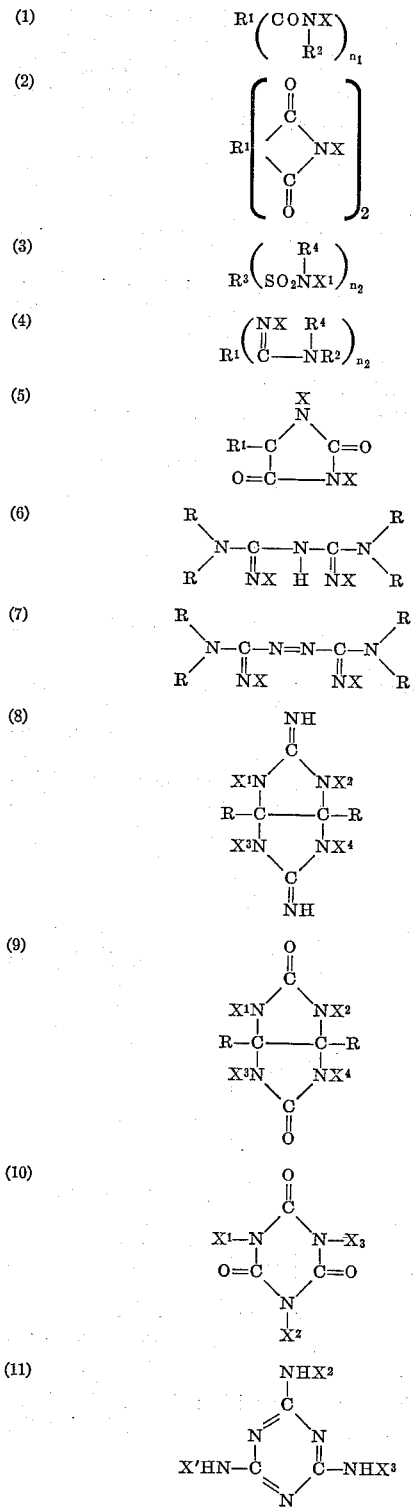

wherein:
(a) R is selected from the group consisting of hydrogen, lower alkyl and phenyl;
(b) $R^1$ is selected from the group consisting of lower alkyl, alkylene having up to twelve carbon atoms, saturated and aromatic monocyclic hydrocarbon radicals, and such radicals further substituted with lower alkyl, lower alkanoyl, lower alkoxy, halogen, carboxylic acid and sulfonic acid groups;

(c) $R^2$ is selected from the group consisting of hydrogen, lower alkyl and aromatic monocyclic hydrocarbon radicals;

(d) $R^3$ is selected from the group consisting of aromatic monocyclic hydrocarbon radicals having up to ten carbon atoms and such radicals further substituted with lower alkyl, lower alkanoyl, lower alkoxy, halogen, carboxylic acid and sulfonic acid groups;

(e) $R^4$ is selected from the group consisting of hydrogen, lower alkyl, lower alkanoyl, phenyl, bromine and chlorine;

(f) X is selected from the group consisting of bromine and chlorine;

(g) $X^1$, $X^2$, $X^3$ and $X^4$ are selected from the group consisting of hydrogen, chlorine and bromine, and at least two are bromine or chlorine;

(h) $n_1$ is an integer from 2 to 4;

(i) $n_2$ is an integer from 1 to 2;

and such compounds as the salts or acid addition salts thereof.

2. A process in accordance with claim 1 wherein at least one of said compounds is a compound having the general formula

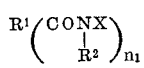

wherein:
(a) $R^1$ is selected from the group consisting of lower alkyl, alkylene having up to twelve carbon atoms, saturated and aromatic monocyclic hydrocarbon radicals, and such radicals further substituted with lower alkyl, lower alkanoyl, lower alkoxy, halogen, carboxylic acid and sulfonic acid groups;

(b) $R^2$ is selected from the group consisting of hydrogen, lower alkyl and aromatic monocyclic hydrocarbon radicals;

(c) X is selected from the group consisting of chlorine and bromine;

(d) $n_1$ is an integer from 2 to 4.

3. A process in accordance with claim 1 wherein at least one of said compounds is a compound having the general formula

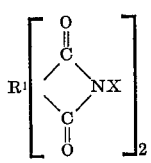

wherein:
(a) $R^1$ is selected from the group consisting of lower alkyl, alkylene having up to twelve carbon atoms, saturated and aromatic monocyclic hydrocarbon radicals, and such radicals further substituted with lower alkyl, lower alkanoyl, lower alkoxy, halogen, carboxylic acid and sulfonic acid groups; and (b) X is selected from the group consisting of bromine and chlorine.

4. A process in accordance with claim 1, wherein at least one of said compounds is a compound having the general formula

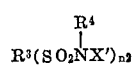

wherein:
(a) $R^3$ is selected from the group consisting of aromatic monocyclic hydrocarbon radicals having up to ten carbon atoms and such radicals further substituted with lower alkyl, lower alkanoyl, lower alkoxy, halogen, carboxylic acid and sulfonic acid groups;

(b) $R^4$ is selected from the group consisting of hydrogen, lower alkyl, lower alkanoyl, phenyl, bromine and chlorine;

(c) $X^1$ is selected from the group consisting of hydrogen, bromine and chlorine;

(d) at least two of $R^4$ and $X^1$ are bromine or chlorine;

(e) $n_2$ is an integer from 1 to 2.

5. A process in accordance with claim 1 wherein at least one of said compounds is a compound having the general formula

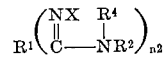

wherein:
(a) $R^1$ is selected from the group consisting of lower alkyl, alkylene having up to twelve carbon atoms, saturated and aromatic monocyclic hydrocarbon radicals, and such radicals further substituted with lower alkyl, lower alkanoyl, lower alkoxy, halogen, carboxylic acid and sulfonic acid groups;

(b) $R^2$ is selected from the group consisting of hydrogen, lower alkyl and aromatic monocyclic hydrocarbon radicals;

(c) $R^4$ is selected from the group consisting of hydrogen, lower alkyl, lower alkanoyl, phenyl, bromine and chlorine; and (d) X is selected from the group consisting of bromine and chlorine; and (e) $n_2$ is an integer from 1 to 2.

6. A process in accordance with claim 1 wherein at least one of said compounds is a compound having the general formula

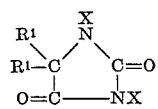

wherein:
(a) $R^1$ is selected from the group consisting of lower alkyl, alkylene having up to twelve carbon atoms, saturated and aromatic monocyclic hydrocarbon radicals, and such radicals further substituted with lower alkyl, lower alkanoyl, lower alkoxy, halogen, carboxylic acid and sulfonic acid groups; and (b) X is selected from the group consisting of bromine and chlorine.

7. A process in accordance with claim 1 wherein at least one of said compounds is a compound having the general formula

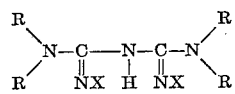

wherein:
(a) R is selected from the group consisting of hydrogen, lower alkyl and phenyl; and (b) X is selected from the group consisting of bromine and chlorine.

8. A process is accordance with claim 1 wherein at least one of said compounds is a compound having the general formula

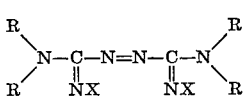

wherein:
(a) R is selected from the group consisting of hydrogen, lower alkyl and phenyl; and (b) X is selected from the group consisting of bromine and chlorine.

9. A process in accordance with claim 1 wherein at least one of said compounds is a compound having the general formula

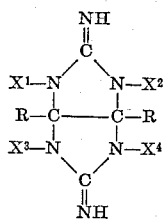

wherein:
(a) R is selected from the group consisting of hydrogen, lower alkyl and phenyl; and
(b) $X^1$, $X^2$, $X^3$ and $X^4$ are selected from the group consisting of hydrogen, chlorine and bromine, and at least two are bromine or chlorine.

10. A process in accordance with claim 1 wherein at least one of said compounds is a compound having the general formula

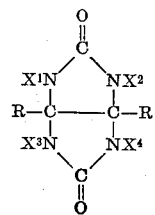

wherein:
(a) R is selected from the group consisting of hydrogen, lower alkyl and phenyl; and
(b) $X^1$, $X^2$, $X^3$ and $X^4$ are selected from the group consisting of hydrogen, chlorine and bromine, and at least two are bromine or chlorine.

11. A process in accordance with claim 1, wherein at least one of said compounds is a compound having the general formula:

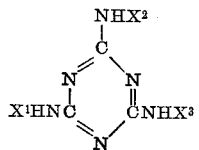

wherein $X^1$, $X^2$ and $X^3$ are selected from the group consisting of hydrogen, chlorine and bromine, and at least two are bromine or chlorine.

12. A process in accordance with claim 1, wherein at least one of said compounds is a compound having the general formula:

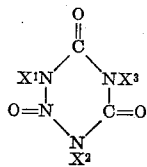

wherein $X^1$, $X^2$ and $X^3$ are selected from the group consisting of hydrogen, chlorine and bromine, and at least two are bromine or chlorine.

13. A process in accordance with claim 1 in which the compounds are mixed in the form of the solids.

14. A process in accordance with claim 1 in which the compounds are mixed in the presence of a solvent.

15. A process in accordance with claim 1 in which the compounds that are mixed are N,N-dichlorodimethyl hydantoin and N,N-dibromodimethylhydantion.

16. A process in accordance with claim 1 in which the compounds that are mixed are an N-multichloroglycoluril and an N-multibromoglycoluril.

17. The method of forming N-brominated-N-chlorinated-5,5-dimethyl-hydantoin comprising mixing N,N'-dibrom-5,5-dimethyl-hydantoin with N,N'-dichloro-5,5-dimethyl-hydantoin.

18. N-bromo-N-chloro-5-methyl-5-alkyl sulfonic acid hydantoin wherein the alkyl group contains from two to five carbon atoms and salts thereof selected from the group consisting of the alkali metal, alkaline earth metal, aluminum, tin and zinc salts.

19. N - bromo - N - chloro - 5 - methyl - 5 - carboxyethyl hydantoin and salts thereof selected from the group consisting of the alkali metal, alkaline earth metal, aluminum, tin and zinc salts.

20. A mixture of compounds initially having the formula

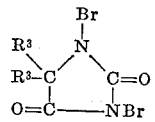

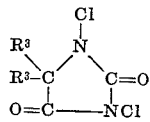

and their N-halogen migration products formed by their admixture having the formula

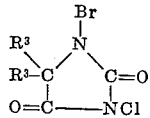

wherein $R^3$ is selected from the group consisting of aromatic monocyclic hydrocarbon radicals having up to ten carbon atoms and such radicals further substituted with lower alkyl, lower alkanoyl, lower alkoxy, halogen, carboxylic aicd and sulfonic acid groups; and salts thereof selected from the group consisting of the alkali metal, alkaline earth metal, aluminum, tin and zinc salts.

References Cited
UNITED STATES PATENTS

| | | | |
|---|---|---|---|
| 2,779,764 | 1/1957 | Paterson | 260—309.5 |
| 2,798,875 | 7/1957 | Scheer et al. | 260—309.5 |
| 2,868,787 | 1/1959 | Paterson | 260—248 |
| 2,945,045 | 7/1950 | Levy et al. | 260—309.5 |

CHARLES B. PARKER, *Primary Examiner.*

JOSEPH P. BRUST, *Examiner.*

F. D. HIGEL, *Assistant Examiner.*

UNITED STATES PATENT OFFICE
CERTIFICATE OF CORRECTION

Patent No. 3,345,371            October 3, 1967

Laurene O. Paterson

It is hereby certified that error appears in the above numbered patent requiring correction and that the said Letters Patent should read as corrected below.

Column 2, formula (8), for "$X_2^4$" and "$X_4$" read -- $X_4^2$ -- and -- $X^4$ --; column 13, lines 55 to 60, for that portion of the formula reading $O=N$      read      $O=C$ column 14, line 13, for "dibrom" read -- dibromo --; line 60, for "7/1950" read -- 7/1960 --.

Signed and sealed this 19th day of November 1968.

(SEAL)
Attest:

Edward M. Fletcher, Jr.            EDWARD J. BRENNER

Attesting Officer            Commissioner of Patents